United States Patent
Kawai et al.

(10) Patent No.: US 11,451,372 B2
(45) Date of Patent: Sep. 20, 2022

(54) PRIVACY-PRESERVING ANALYSIS DEVICE, PRIVACY-PRESERVING ANALYSIS SYSTEM, PRIVACY-PRESERVING ANALYSIS METHOD, AND COMPUTER READABLE MEDIUM

(71) Applicant: Mitsubishi Electric Corporation, Tokyo (JP)

(72) Inventors: Yutaka Kawai, Tokyo (JP); Takato Hirano, Tokyo (JP); Yoshihiro Koseki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 84 days.

(21) Appl. No.: 16/767,018

(22) PCT Filed: Jan. 17, 2018

(86) PCT No.: PCT/JP2018/001211
§ 371 (c)(1),
(2) Date: May 26, 2020

(87) PCT Pub. No.: WO2019/142260
PCT Pub. Date: Jul. 25, 2019

(65) Prior Publication Data
US 2021/0014040 A1  Jan. 14, 2021

(51) Int. Cl.
*H04L 9/06*  (2006.01)
*H04L 9/08*  (2006.01)
*H04L 9/32*  (2006.01)

(52) U.S. Cl.
CPC .......... *H04L 9/0618* (2013.01); *H04L 9/0861* (2013.01); *H04L 9/3213* (2013.01)

(58) Field of Classification Search
CPC ... H04L 9/0618; H04L 9/0861; H04L 9/3213; H04L 9/0662; H04L 9/0894
See application file for complete search history.

(56) References Cited

U.S. PATENT DOCUMENTS

| | | | | |
|---|---|---|---|---|
| 7,724,906 B2 * | 5/2010 | Matsushita | ........... | H04L 9/0894 380/277 |
| 9,413,531 B2 * | 8/2016 | Takashima | ............... | H04L 9/088 |
| 2009/0279694 A1 | 11/2009 | Takahashi et al. | | |

FOREIGN PATENT DOCUMENTS

| JP | 2009-272995 A | | 11/2009 |
|---|---|---|---|
| JP | 2011150006 A | * | 8/2011 |

(Continued)

OTHER PUBLICATIONS

Abdalla et al., "Multi-Input Functional Encryption for Inner Products: Function-Hiding Realizations and Constructions without Pairings," Cryptology ePrint Archive: Report 2017/972, Oct. 3, 2017, pp. 1-40.

(Continued)

*Primary Examiner* — Kristine L Kincaid
*Assistant Examiner* — Lydia L Noel
(74) *Attorney, Agent, or Firm* — Birch, Stewart, Kolasch & Birch, LLP

(57) ABSTRACT

An encryption device (50) generates a ciphertext ct encrypted from information x with using an encryption token etk. A decryption key generation device (60) generates a decryption key dk from a user secret key sk in which a vector y is set, with using a decryption token dtk corresponding to the encryption token etk. A privacy-preserving analysis device (70) decrypts the ciphertext ct generated by the encryption device (50), by means of the decryption key dk generated by the decryption key generation device (60), so as to generate a result of computation over the vector x and the vector y.

4 Claims, 19 Drawing Sheets

(56) References Cited

FOREIGN PATENT DOCUMENTS

| JP | 2012-195733 A | 10/2012 |
| JP | 2016-114901 A | 6/2016 |
| WO | WO 2016/103960 A1 | 6/2016 |

OTHER PUBLICATIONS

Abdalla et al., "Multi-Input Inner-Product Functional Encryption from Pairings," Annual International Conference on the Theory and Applications of Cryptographic Techniques, EUROCRYPT 2017: Advances in Cryptology—EUROCRYPT, Apr. 1, 2017. pp. 1-46.
International Search Report (PCT/ISA/210) issued in PCT/JP2018/001211, dated Apr. 3, 2018.
Kurokawa et al., "Implimentation of Secure Computation for Recursive Functions," 2015 Symposium on Cryptography and Information Security, Jan. 20, 2015, pp. 1-8.
Notice of Reasons for Refusal issued in Japanese Application No. 2018-536207, dated Oct. 2, 2018.

\* cited by examiner

PRIVACY-PRESERVING ANALYSIS DEVICE, PRIVACY-PRESERVING ANALYSIS SYSTEM, PRIVACY-PRESERVING ANALYSIS METHOD, AND COMPUTER READABLE MEDIUM

TECHNICAL FIELD

The present invention relates to a technique that executes computation over data remaining encrypted.

BACKGROUND ART

In principle, once data is encrypted, it is impossible to browse and edit data in the encrypted data unless decrypting the encrypted data. Therefore, when editing data containing a plurality of ciphertexts, it is necessary to decrypt the ciphertexts into plaintexts once, then perform editing, and then encrypt the edited plaintexts again.

Functional encryption (to be referred to as inner-product encryption hereinafter) which can perform inner-product calculation is available (see Patent Literature 1 and Non-Patent Literature 1). According to the inner-product encryption, when executing encryption, a vector x is set, and a vector y is set in a user secret key. When decrypting a ciphertext, an inner product $<x, y>$ of the vector x and the vector y is outputted. That is, the inner-product encryption is an encryption that can perform inner-product calculation over data remaining encrypted. In the following description, an inner product of the vector x and the vector y is expressed as $<x, y>$.

The inner-product encryption is classified into single-input inner-product encryption and multi-input inner-product encryption. The single-input inner-product encryption can calculate only one inner product in decryption. In contrast to this, the multi-input inner-product encryption can set N of vectors $y_1, \ldots, y_N$ in a secret key, and in decryption, with taking as input N of ciphertexts, can calculate $<x_1, y_1> + <x_2, y_2> + \ldots + <x_N, y_N>$.

CITATION LIST

Patent Literature

Patent Literature 1: JP 2009-272995 A

Non-Patent Literature

Non-Patent Literature 1: Multi-Input Functional Encryption for Inner Products: Function-Hiding Realizations and Constructions without Pairings Michel Abdalla and Dario Catalano and Dario Fiore and Romain Gay and Bogdan Ursu in Cryptology ePrint Archive:

SUMMARY OF INVENTION

Technical Problem

The method described in Non-Patent Literature 1 can calculate a sum of N of inner products. However, with the method described in Non-Patent Literature 1, any user having at least one user secret key and capable of executing encryption can analogize a vector associated with a ciphertext.

Multi-input inner-product encryption is expected to perform analysis such as inner product over a plurality of ciphertexts uploaded to the cloud, without decrypting the ciphertexts. However, in the method described in Non-Patent Literature 1, information, for example, a value of a vector in the case of inner product, which is set in individual ciphertext and should not leak originally, leaks undesirably.

It is an objective of the present invention to prevent leakage of information being set in a ciphertext, while enabling computation such as inner product over data remaining encrypted.

Solution to Problem

A privacy-preserving analysis device according to the present invention includes:

a ciphertext acquisition unit to acquire a ciphertext ct encrypted from information x with using an encryption token etk; and a decryption unit to decrypt the ciphertext et acquired by the ciphertext acquisition unit, by a decryption key dk generated from a user secret key sk in which information y is set, with using a decryption token dtk corresponding to the encryption token etk, so as to generate a result of computation over the information x and the information y.

Advantageous Effects of Invention

According to the present invention, a result of computation over information x and information y is generated not by means of a user secret key sk but by means of a decryption key dk generated from the user secret key sk with using a decryption token dtk. Computation cannot be performed even if the user has a user secret key sk. Therefore, leakage of information to a user having the user secret key sk can be prevented.

DESCRIPTION OF EMBODIMENTS

Embodiment 1

Figure 1:
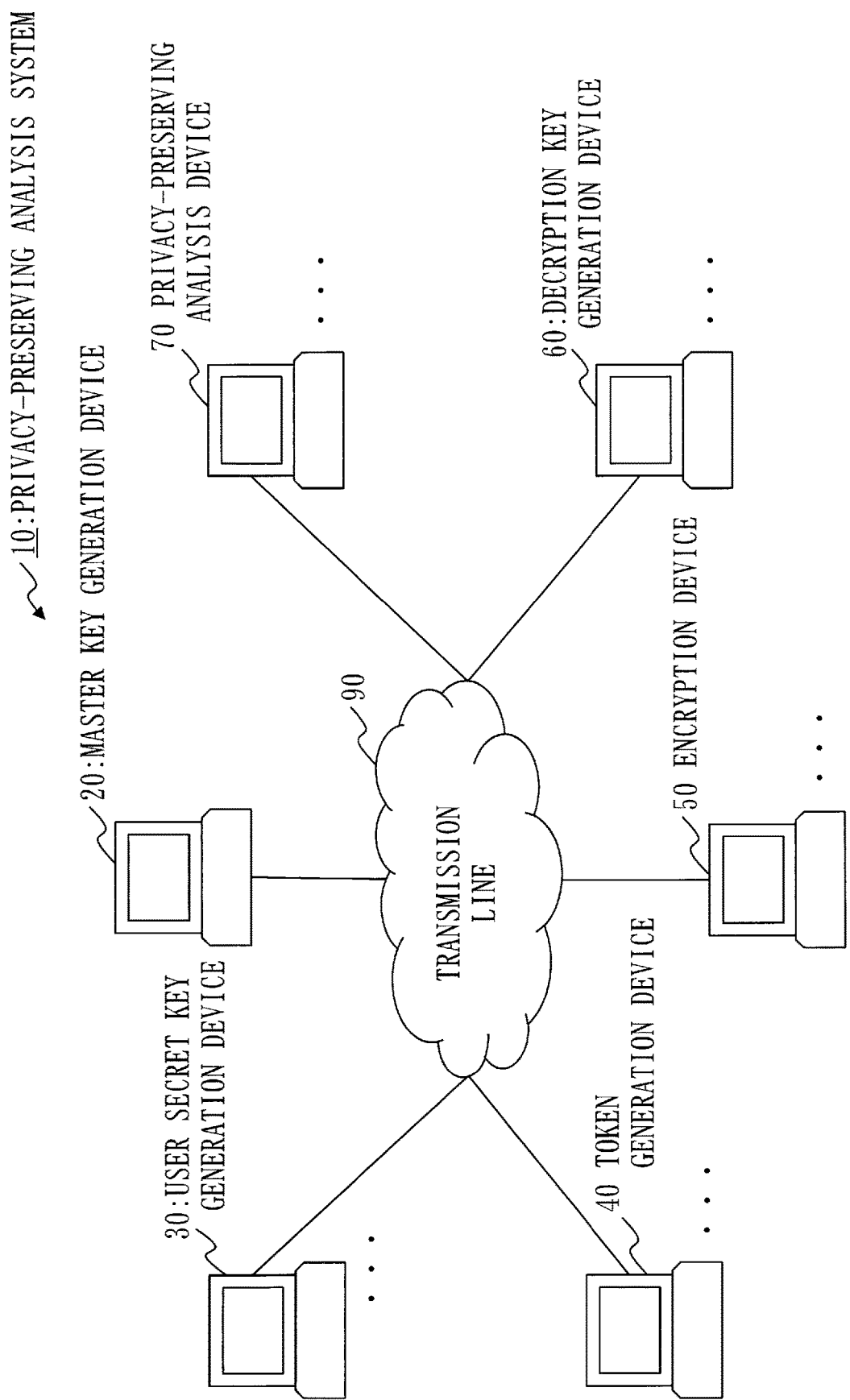
FIG. 1 is a configuration diagram of a privacy-preserving analysis system 10 according to Embodiment 1.

A configuration of a privacy-preserving analysis system 10 according to Embodiment 1 will be described with referring to FIG. 1.

The privacy-preserving analysis system 10 is provided with a master key generation device 20, one or more user secret key generation devices 30, one or more token generation devices 40, one or more encryption devices 50, one or more decryption key generation devices 60, and one or more privacy-preserving analysis devices 70.

The master key generation device 20, user secret key generation device 30, token generation device 40, encryption device 50, decryption key generation device 60, and privacy-preserving analysis device 70 are connected to each other via a transmission line 90. A specific example of the transmission line 90 is the Internet or a local area network (LAN).

A configuration of the master key generation device 20 according to Embodiment 1 will be described with referring to FIG. 2.

The master key generation device 20 is provided with hardware devices which are a processor 21, a memory 22, a storage 23, and a communication interface 24. The processor 21 is connected to the other hardware devices via signal lines and controls these other hardware devices.

The master key generation device 20 is provided with a parameter acquisition unit 211, a master key generation unit 212, and a transmission unit 213, as function-constituent elements. Functions of the individual function-constituent elements of the master key generation device 20 are implemented by software.

A program that implements the functions of the individual function-constituent elements of the master key generation device 20 is stored in the storage 23. This program is read into the memory 22 by the processor 21 and executed by the processor 21. Thus, the functions of the individual function-constituent elements of the master key generation device 20 are implemented.

Also, the storage 23 implements a function of a master key storage unit 231.

Figure 3:
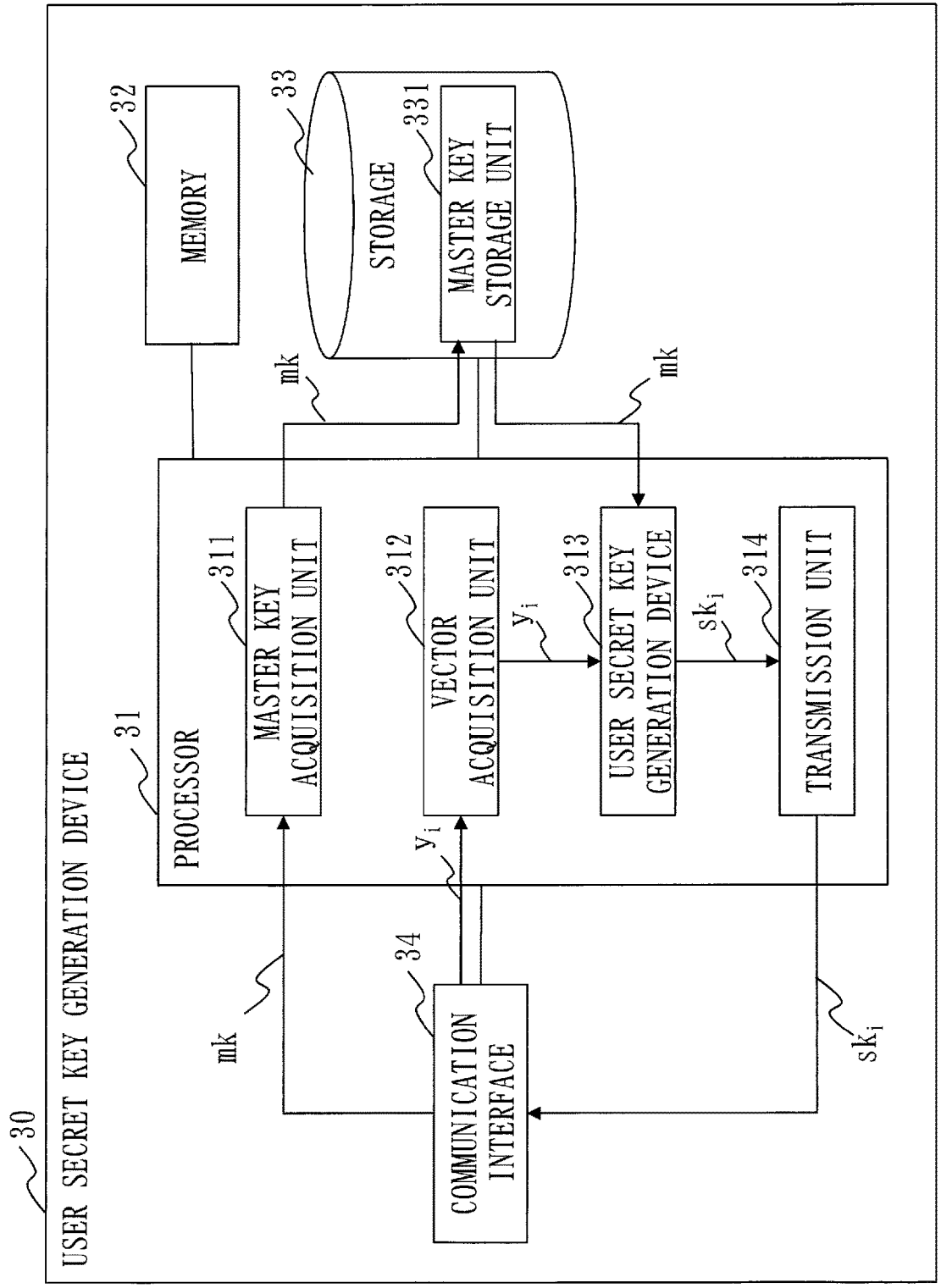
FIG. 3 is a configuration diagram of a user secret key generation device 30 according to Embodiment 1.

A configuration of the user secret key generation device 30 according to Embodiment 1 will be described with referring to FIG. 3.

The user secret key generation device 30 is provided with hardware devices which are a processor 31, a memory 32, a storage 33, and a communication interface 34. The processor 31 is connected to the other hardware devices via signal lines and controls these other hardware devices.

The user secret key generation device 30 is provided with a master key acquisition unit 311, a vector acquisition unit 312, a user secret key generation unit 313, and a transmission unit 314, as function-constituent elements. Functions of the individual function-constituent elements of the user secret key generation device 30 are implemented by software.

A program that implements the functions of the individual function-constituent elements of the user secret key generation device 30 is stored in the storage 33. This program is read into the memory 32 by the processor 31 and executed by the processor 31. Thus, the functions of the individual function-constituent elements of the user secret key generation device 30 are implemented.

Also, the storage 33 implements a function of a master key storage unit 331.

Figure 4:
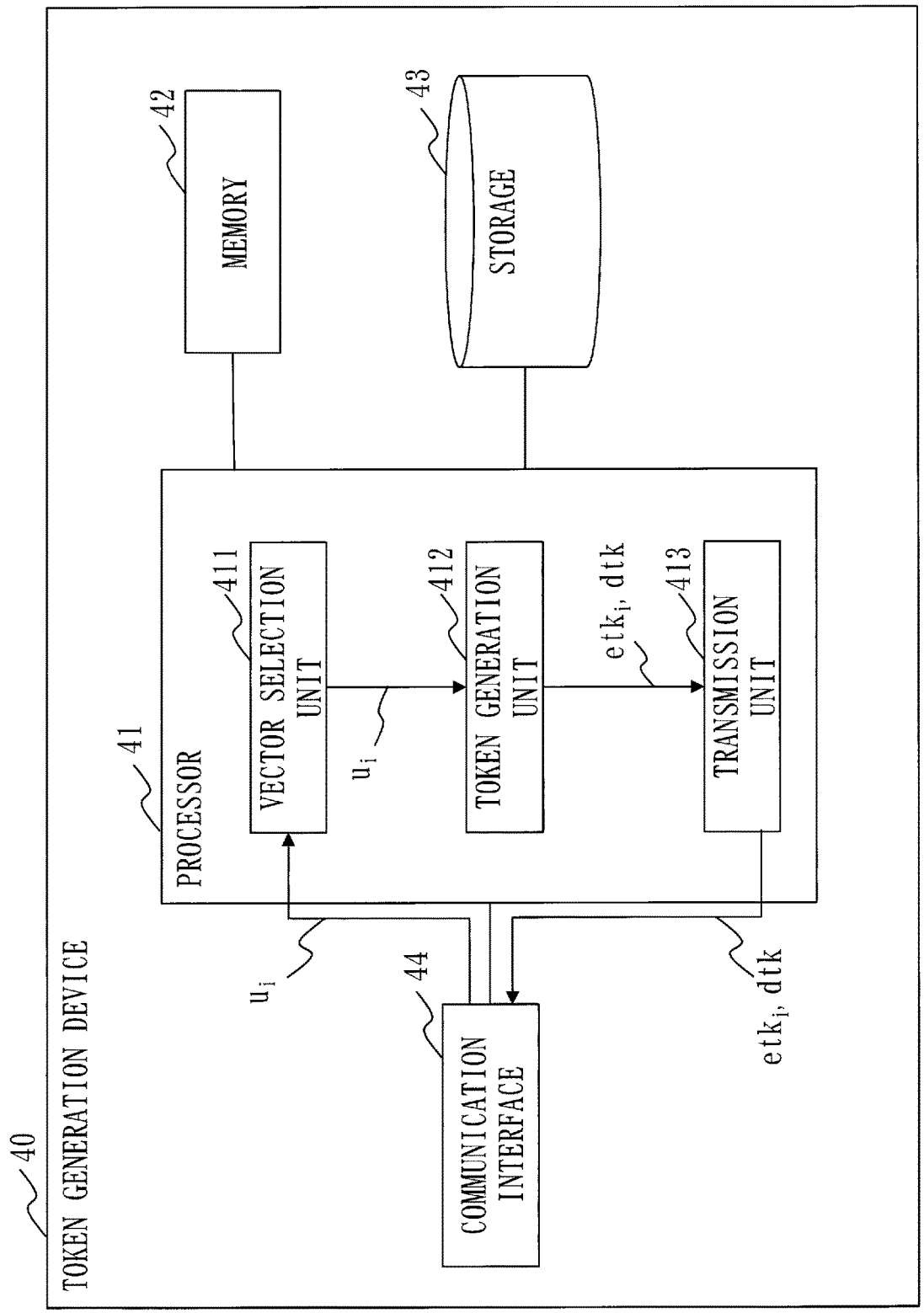
FIG. 4 is a configuration diagram of a token generation device 40 according to Embodiment 1.

A configuration of the token generation device 40 according to Embodiment 1 will be described with referring to FIG. 4.

The token generation device 40 is provided with hardware devices which are a processor 41, a memory 42, a storage 43, and a communication interface 44. The processor 41 is connected to the other hardware devices via signal lines and controls these other hardware devices.

The token generation device 40 is provided with a vector selection unit 411, a token generation unit 412, and a transmission unit 413, as function-constituent elements. Functions of the individual function-constituent elements of the token generation device 40 are implemented by software.

A program that implements the functions of the individual function-constituent elements of the token generation device 40 is stored in the storage 43. This program is read into the memory 42 by the processor 41 and executed by the processor 41. Thus, the functions of the individual function-constituent elements of the token generation device 40 are implemented.

Figure 5:
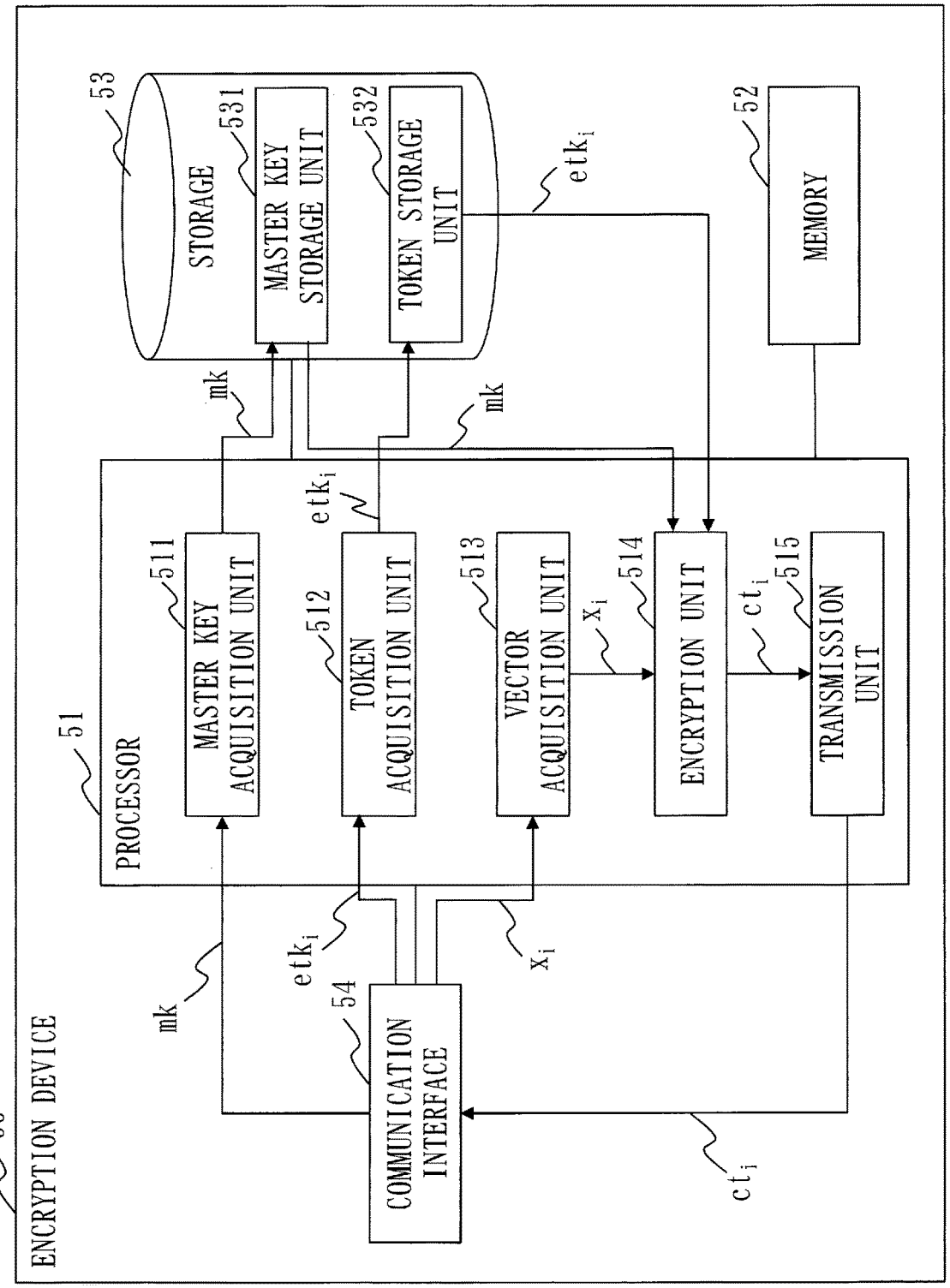
FIG. 5 is a configuration diagram of an encryption device 50 according to Embodiment 1.

A configuration of the encryption device 50 according to Embodiment 1 will be described with referring to FIG. 5.

The encryption device 50 is provided with hardware devices which are a processor 51, a memory 52, a storage 53, and a communication interface 54. The processor 51 is connected to the other hardware devices via signal lines and controls these other hardware devices.

The encryption device 50 is provided with a master key acquisition unit 511, a token acquisition unit 512, a vector acquisition unit 513, an encryption unit 514, and a transmission unit 515, as function-constituent elements. Functions of the individual function-constituent elements of the encryption device 50 are implemented by software.

A program that implements the functions of the individual function-constituent elements of the encryption device 50 is stored in the storage 53. This program is read into the memory 52 by the processor 51 and executed by the processor 51. Thus, the functions of the individual function-constituent elements of the encryption device 50 are implemented.

Also, the storage 53 implements functions of a master key storage unit 531 and token storage unit 532.

Figure 6:
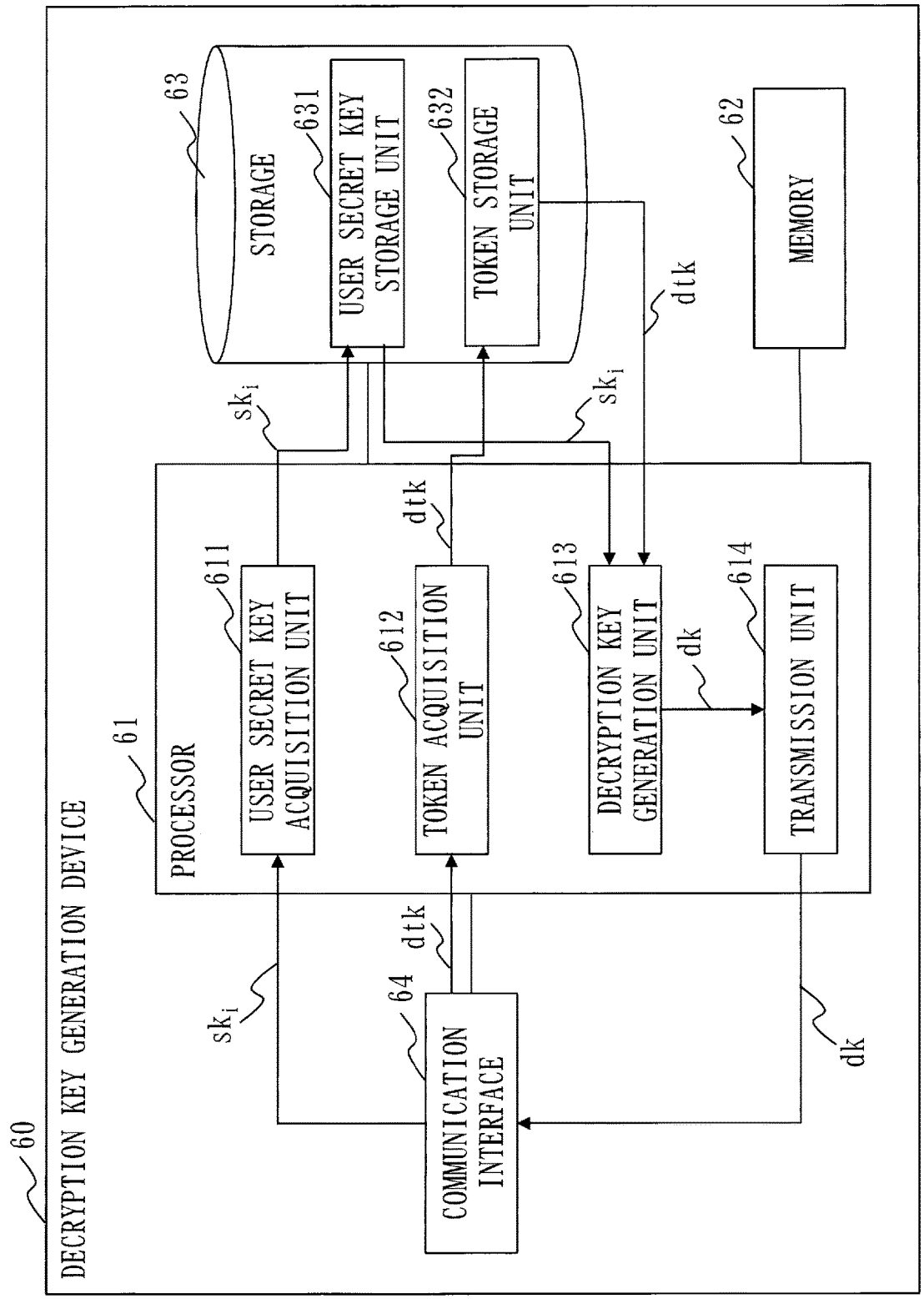
FIG. 6 is a configuration diagram of a decryption key generation device 60 according to Embodiment 1.

A configuration of the decryption key generation device 60 according to Embodiment 1 will be described with referring to FIG. 6.

The decryption key generation device 60 is provided with hardware devices which are a processor 61, a memory 62, a storage 63, and a communication interface 64. The processor 61 is connected to the other hardware devices via signal lines and controls these other hardware devices.

The decryption key generation device 60 is provided with a user secret key acquisition unit 611, a token acquisition unit 612, a decryption key generation unit 613, and a transmission unit 614, as function-constituent elements. Functions of the individual function-constituent elements of the decryption key generation device 60 are implemented by software.

A program that implements the functions of the individual function-constituent elements of the decryption key generation device 60 is stored in the storage 63. This program is read into the memory 62 by the processor 61 and executed by the processor 61. Thus, the functions of the individual function-constituent elements of the decryption key generation device 60 are implemented.

The storage 63 implements functions of a user secret key storage unit 631 and token storage unit 632.

Figure 7:
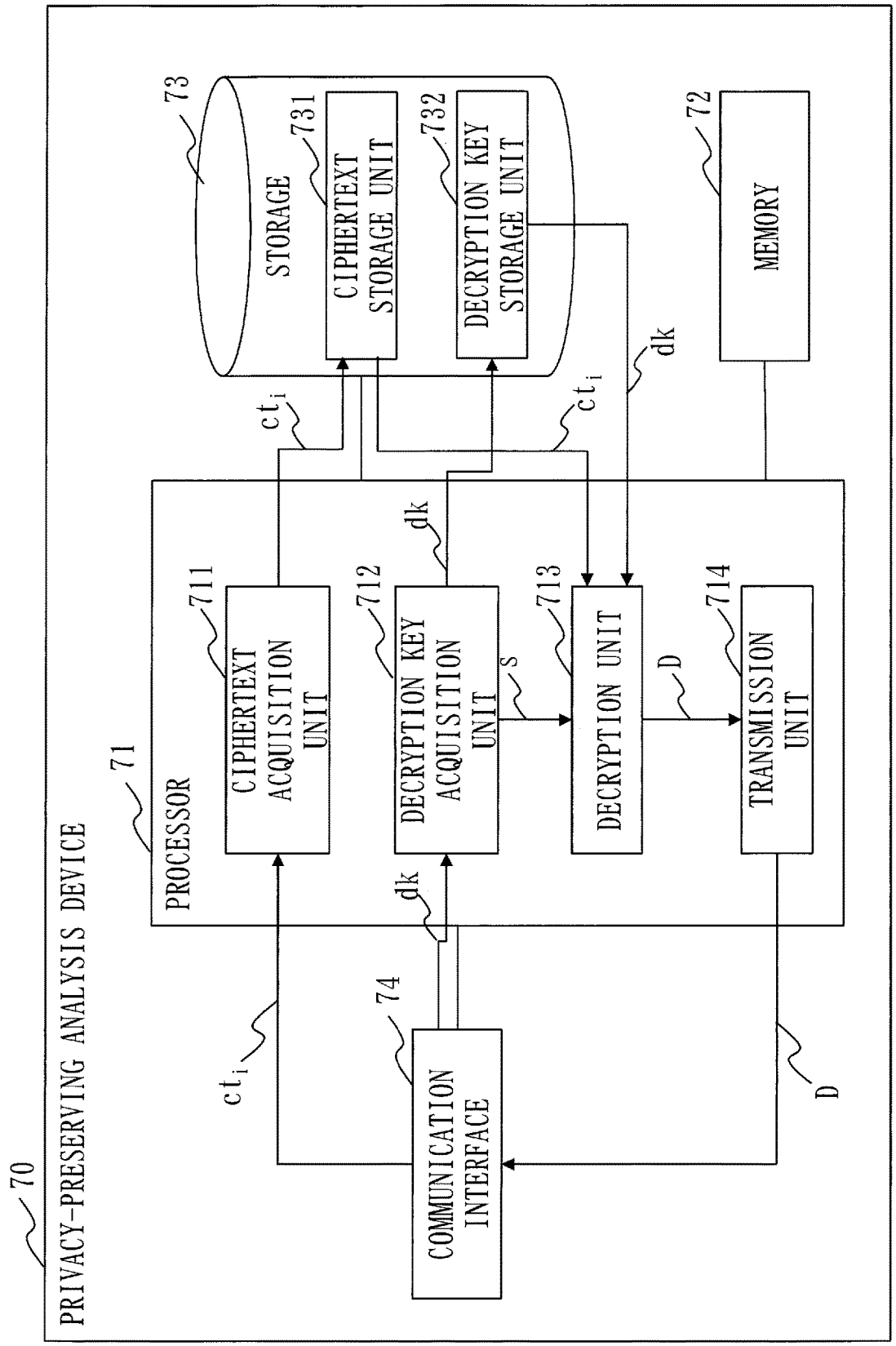
FIG. 7 is a configuration diagram of a privacy-preserving analysis device 70 according to Embodiment 1.

A configuration of the privacy-preserving analysis device 70 according to Embodiment 1 will be described with referring to FIG. 7.

The privacy-preserving analysis device 70 is provided with hardware devices which are a processor 71, a memory 72, a storage 73, and a communication interface 74. The processor 71 is connected to the other hardware devices via signal lines and controls these other hardware devices.

The privacy-preserving analysis device 70 is provided with a ciphertext acquisition unit 711, a decryption key acquisition unit 712, a decryption unit 713, and a transmission unit 714, as function-constituent elements. Functions of the individual function-constituent elements of the privacy-preserving analysis device 70 are implemented by software.

A program that implements the functions of the individual function-constituent elements of the privacy-preserving analysis device 70 is stored in the storage 73. This program is read into the memory 72 by the processor 71 and executed by the processor 71. Thus, the functions of the individual function-constituent elements of the privacy-preserving analysis device 70 are implemented.

The storage 73 implements functions of a ciphertext storage unit 731 and decryption key storage unit 732.

The processors 21, 31, 41, 51, 61, and 71 are each an integrated circuit (IC) which performs computation processing. Specific examples of each of the processors 21, 31, 41, 51, 61, and 71 include a central processing unit (CPU), a digital signal processor (DSP), and a graphics processing unit (GPU).

The memories 22, 32, 42, 52, 62, and 72 are each a storage device which stores data temporarily. Specific examples of each of the memories 22, 32, 42, 52, 62, and 72 include a static random access memory (SRAM) and a dynamic random access memory (DRAM).

The storages 23, 33, 43, 53, 63, and 73 are each a storage device which stores data. Specific examples of each of the storages 23, 33, 43, 53, 63, and 73 include a hard disk drive (HDD). Each of the storages 23, 33, 43, 53, 63, and 73 may be a portable storage medium such as an SD (registered trademark; secure digital) memory card, a CompactFlash (registered trademark; CF), a NAND flash, a flexible disk, an optical disk, a compact disk, a blu-ray (registered trademark) disk, and a digital versatile disk (DVD).

The communication interfaces 24, 34, 44, 54, 64, and 74 are interfaces to communicate with external devices. Specific examples of each of the communication interfaces 24, 34, 44, 54, 64, and 74 include an Ethernet (registered trademark) port, a universal serial bus (USB) port, and an HDMI (registered trademark; high-definition multimedia interface) port.

Figure 2:
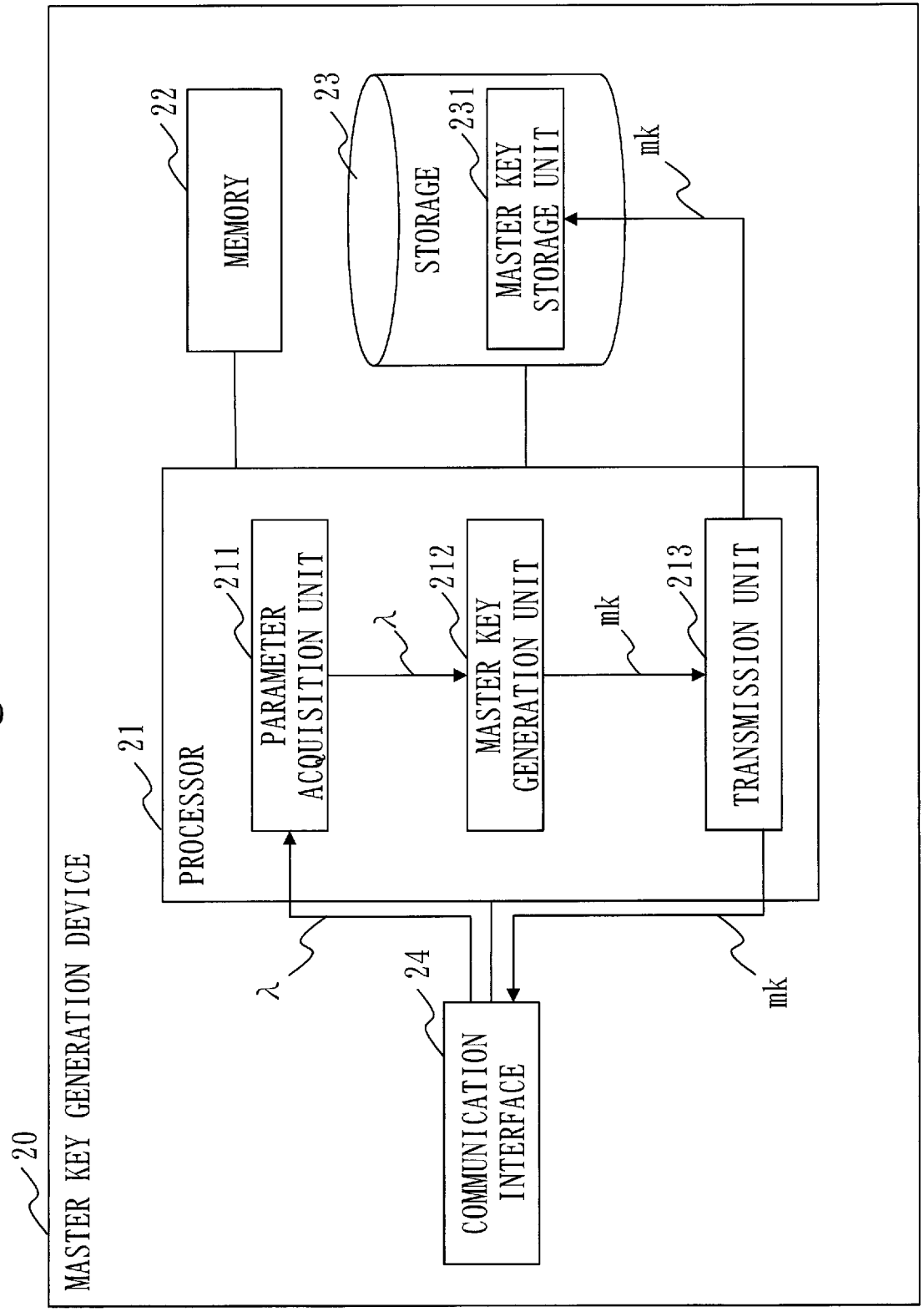
FIG. 2 is a configuration diagram of a master key generation device 20 according to Embodiment 1.

FIG. 2 illustrates only one processor 21. However, the master key generation device 20 may be provided with a plurality of processors which substitute for the processor 21. Likewise, the user secret key generation device 30 may be provided with a plurality of processors which substitute for the processor 31. The token generation device 40 may be provided with a plurality of processors which substitute for the processor 41. The encryption device 50 may be provided with a plurality of processors which substitute for the processor 51. The decryption key generation device 60 may be provided with a plurality of processors which substitute for the processor 61. The privacy-preserving analysis device 70 may be provided with a plurality of processors which substitute for the processor 71.

The plurality of processors share execution of the program that implements the functions of the individual function-constituent elements. Each processor is an IC which performs computation processing, as the processors 21, 31, 41, 51, 61, and 71 do.

*Description of Behavior*

Behavior of the privacy-preserving analysis system 10 according to Embodiment 1 will be described with referring to FIGS. 8 to 13.

The privacy-preserving analysis system 10 uses existing single-input inner-product encryption. Specific examples of the existing single-input inner-product encryption include the method described in Non-Patent Literature 1.

The single-input inner-product encryption involves Setup algorithm, KeyGen algorithm, Enc algorithm, and Dec algorithm.

The Setup algorithm is a master key generation algorithm. The Setup algorithm takes as input a key bit length $\lambda$, and generates a master secret key msk and a master public key mpk.

The KeyGen algorithm is a user secret key generation algorithm. The KeyGen algorithm takes as input an m-dimensional vector y and a master key mk, and generates a secret key sk, where m is an integer of 1 or more.

The Enc algorithm is an encryption algorithm. The Enc algorithm takes as input an m-dimensional vector x and the master key mk, and generates a ciphertext ct.

The Dec algorithm is a decryption algorithm. The Dec algorithm takes as input the ciphertext ct and the secret key sk, and generates an inner product $<x, y>$ of the vector x and the vector y.

Figure 8:
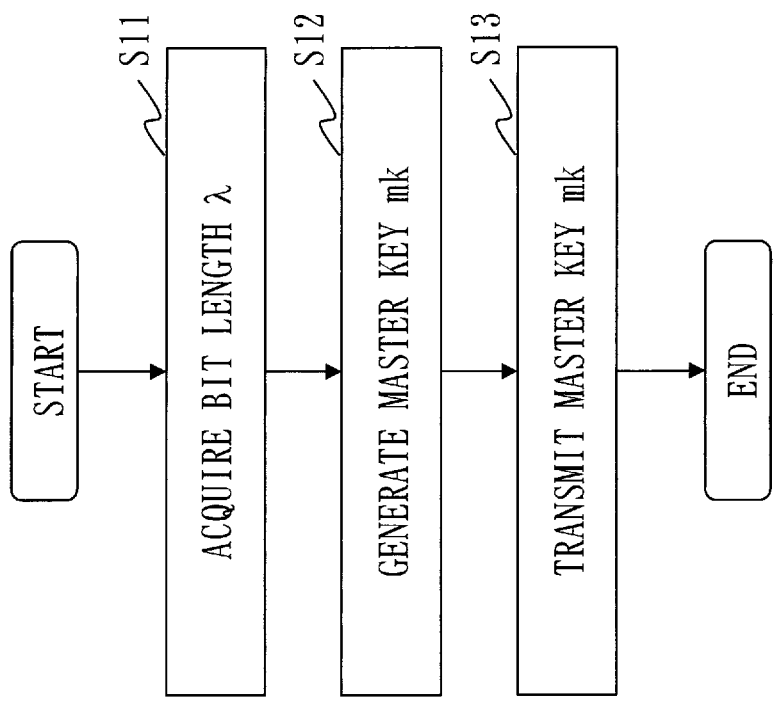
FIG. 8 is a flowchart illustrating behavior of the master key generation device 20 according to Embodiment 1.

Behavior of the master key generation device 20 according to Embodiment 1 will be described with referring to FIG. 8.

The behavior of the master key generation device 20 according to Embodiment 1 corresponds to a master key generation method according to Embodiment 1. The behavior of the master key generation device 20 according to Embodiment 1 also corresponds to processing of a master key generation program according to Embodiment 1.

(Step S11: Parameter Acquisition Process)

The parameter acquisition unit 211 acquires a key bit length $\lambda$.

Specifically, the parameter acquisition unit 211 acquires the key bit length $\lambda$ inputted by an input device or the like which is connected via the communication interface 24. The parameter acquisition unit 211 writes the key bit length $\lambda$ to the memory 22.

If there is a parameter that is necessary in addition to the key bit length $\lambda$, the parameter acquisition unit 211 acquires that parameter as well.

(Step S12: Master Key Generation Process)

The master key generation unit 212 generates a master key mk.

Specifically, the master key generation unit 212 reads out the key bit length $\lambda$ of the key from the memory 22. For each integer i of i=1, . . . , n, the master key generation unit 212 takes as input the key bit length $\lambda$, and executes the Setup algorithm to generate a pair of a master secret key $msk_i$ and a master public key $mpk_i$ where n is an integer of 1 or more. The master key generation unit 212 treats a set of master secret key $msk_i$ and master public key $mpk_i$, for each integer i of i=1, ..., n as the master key mk. In short, mk:=($msk_1$, $msk_2$, ..., $msk_n$, $mpk_1$, $mpk_2$, ..., $mpk_n$). The master key generation unit 212 writes the master key mk to the memory 22.

The master key generation unit 212 may be provided with a random number generation function if generation of random numbers is necessary for executing the Setup algorithm.

(Step S13: Transmission Process)

The transmission unit 213 transmits the master key mk to the user secret key generation device 30 and the encryption device 50.

Specifically, the transmission unit 213 reads out the master key mk from the memory 22. The transmission unit 213 transmits the master key mk to the user secret key generation device 30 and the encryption device 50 via the communication interface 24.

Then, the master key acquisition unit 311 of the user secret key generation device 30 receives the master key mk via the communication interface 34. The master key acquisition unit 311 writes the master key mk to the master key storage unit 331. Also, the master key acquisition unit 511 of the encryption device 50 receives the master key mk via the communication interface 54. The master key acquisition unit 511 writes the master key mk to the master key storage unit 531.

The transmission unit 213 may transmit only the master secret keys $msk_1$, $msk_2$, ..., $msk_n$ of the master key mk to the user secret key generation device 30, and may transmit only the master public keys $mpk_1$, $mpk_2$, ..., $mpk_n$ of the master key mk to the encryption device 50.

The transmission unit 213 also writes the master key mk to the master key storage unit 231.

Figure 9:
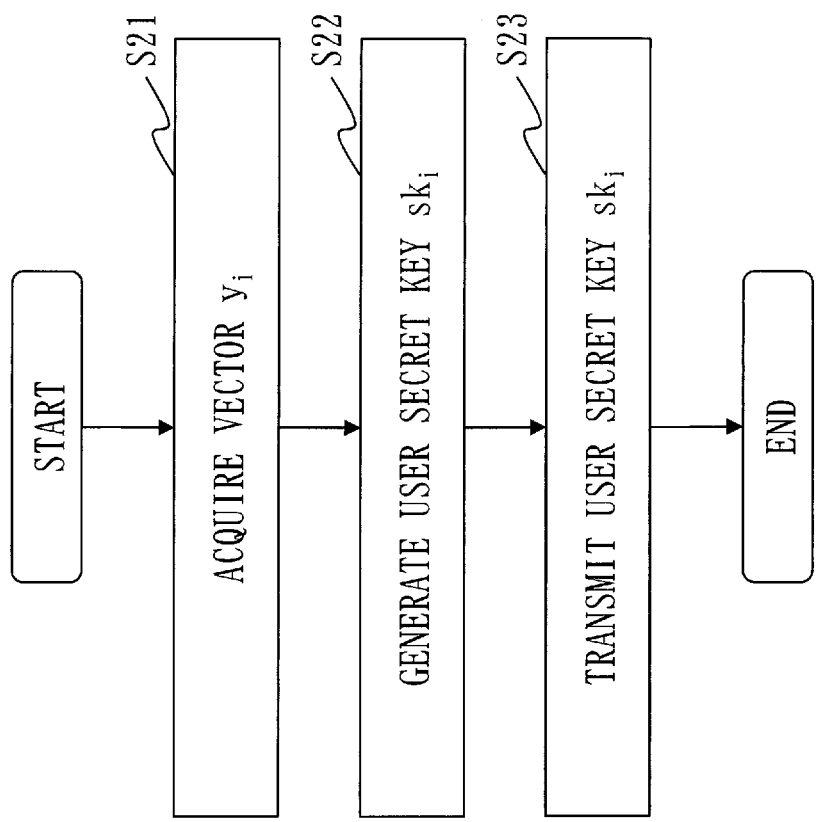
FIG. 9 is a flowchart illustrating behavior of the user secret key generation device 30 according to Embodiment 1.

Behavior of the user secret key generation device 30 according to Embodiment 1 will be described with referring to FIG. 9.

The behavior of the user secret key generation device 30 according to Embodiment 1 corresponds to a user secret key generation method according to Embodiment 1. The behavior of the user secret key generation device 30 according to Embodiment 1 also corresponds to processing of a user secret key generation program according to Embodiment 1.

(Step S21: Vector Acquisition Process)

The vector acquisition unit 312 acquires an m-dimensional vector $y_i$ for each integer i of i=1, ..., n.

Specifically, the vector acquisition unit 312 acquires the vector $y_i$ inputted by an input device or the like which is connected via the communication interface 24.

The vector acquisition unit 312 writes the vector $y_i$ to the memory 32.

(Step S22: User Secret Key Generation Process)

The user secret key generation unit 313 generates a user secret key $sk_i$ for each integer i of i=1, ..., n.

Specifically, the user secret key generation unit 313 reads out the vector $y_i$ for each integer i of i=1, ..., n from the memory 32. The user secret key generation unit 313 also reads out the master key mk from the master key storage unit 331. For each integer i of i=1, ..., n, the user secret key generation unit 313 takes as input the vector $y_i$ and the master secret key $msk_i$, and executes the KeyGen algorithm to generate the user secret key $sk_i$. The user secret key $sk_i$ includes a key $key_i$ in which the vector $y_i$ is set, and the vector $y_i$. The user secret key generation unit 313 writes the user secret key $sk_i$ to the memory 32.

The user secret key generation unit 313 may be provided with a random number generation function if generation of random numbers is necessary for executing the KeyGen algorithm.

(Step S23: Transmission Process)

The transmission unit 314 transmits the user secret key $sk_i$ for each integer i of i=1, ..., n to the decryption key generation device 60.

Specifically, the transmission unit 314 reads out the user secret key $sk_i$ for each integer i of i=1, ..., n from the memory 32. The transmission unit 314 transmits the user secret key $sk_i$ for each integer i of i=1, ..., n to the decryption key generation device 60 via the communication interface 34.

Then, the user secret key acquisition unit 611 of the decryption key generation device 60 receives the user secret key $sk_i$ for each integer i of i=1, ..., n. The user secret key acquisition unit 611 writes the user secret key $sk_i$ for each integer i of i=1, ..., n to the user secret key storage unit 631.

In the above case, one user secret key generation device 30 generates the user secret key $sk_i$ for each integer i of i=1, ..., n. Alternatively, a plurality of user secret key generation devices 30 may each generate a user secret key $sk_i$ for an integer i of i=1, ..., n. For example, a user secret key generation device $30_i$ for an integer i of i=1, ..., n may generate a user secret key $sk_i$.

Figure 10:
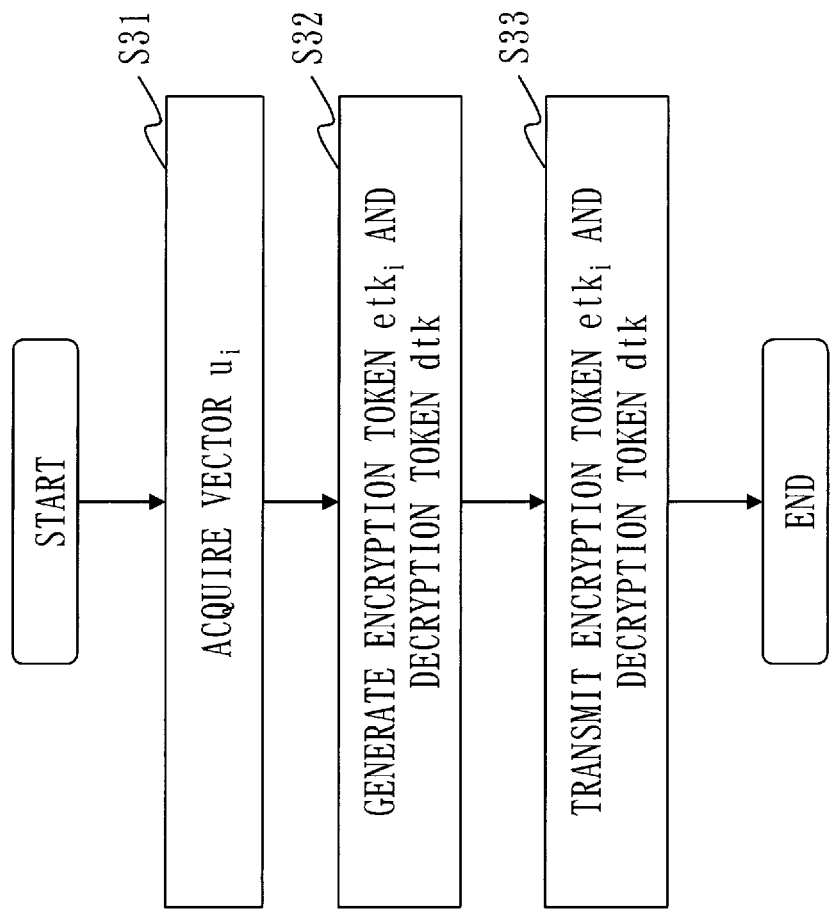
FIG. 10 is a flowchart illustrating behavior of the token generation device 40 according to Embodiment 1.

Behavior of the token generation device 40 according to Embodiment 1 will be described with referring to FIG. 10.

The behavior of the token generation device 40 according to Embodiment 1 corresponds to a token generation method according to Embodiment 1. The behavior of the token generation device 40 according to Embodiment 1 also corresponds to processing of a token generation program according to Embodiment 1.

(Step S31: Vector Selection Process)

The vector selection unit 411 selects an m-dimensional vector $u_i$ for each integer i of i=1, ..., n.

Specifically, the vector selection unit 411 randomly selects the m-dimensional vector $u_i$ for each integer i of i=1, ..., n using a random number generation function or the like. The vector selection unit 411 writes the vector $u_i$ to the memory 42.

(Step S32: Token Generation Process)

The token generation unit 412 generates an encryption token $etk_i$ for each integer i of i=1, ..., n, and a decryption token dtk. The decryption token dtk corresponds to the encryption token $etk_i$ for each integer i of i=1, ..., n.

Specifically, the token generation unit 412 reads out the vector $u_i$ for each integer i of i=1, ..., n from the memory 42. For each integer i of i=1, ..., n, the token generation unit 412 treats the vector $u_i$ as the encryption token $etk_i$. In short, $etk_i := u_i$.

The token generation unit 412 also treats a set of vector $u_i$ for each integer i of i=1, ..., n, as the decryption token dtk. In short, dtk:=($u_1$, $u_2$, ..., $u_n$). The token generation unit 412 writes the encryption token $etk_i$ for each integer i of i=1, ..., n, and the decryption token dtk to the memory 42.

(Step S33: Transmission Process)

The transmission unit 413 transmits the encryption token $etk_i$ for each integer i of i=1, ..., n to the encryption device 50. The transmission unit 413 also transmits the decryption token dtk to the decryption key generation device 60.

Specifically, the transmission unit 413 reads out the encryption token $etk_i$ for each integer i of i=1, ..., n, and the decryption token dtk from the memory 42. The transmission unit 413 transmits the encryption token $etk_i$ for each integer i of i=1, ..., n to the encryption device 50 via the communication interface 44. The transmission unit 413 also transmits the decryption token dtk to the decryption key generation device 60 via the communication interface 44.

Then, the token acquisition unit 512 of the encryption device 50 receives the encryption token $etk_i$ for each integer i of i=1, ..., n via the communication interface 54. The token acquisition unit 512 writes the encryption token $etk_i$ for each integer i of i=1, ..., n to the token storage unit 532. Also, the token acquisition unit 612 of the decryption key generation device 60 receives the decryption token dtk via the communication interface 64. The token acquisition unit 612 writes the decryption token dtk to the token storage unit 632.

In the above case, one token generation device 40 generates the encryption token $etk_i$ for each integer i of i=1, ..., n. Alternatively, a plurality of token generation devices 40 may each generate an encryption token $etk_i$ for an integer i of i=1, ..., n. For example, a token generation device 40$i$ for an integer i of i=1, ..., n may generate an encryption token $etk_i$. In this case, each token generation device 40 transmits an encryption token $etk_i$ for an integer i of i=1, ..., n to a certain token generation device 40, and the certain token generation device 40 generates a decryption token dtk.

Figure 11:
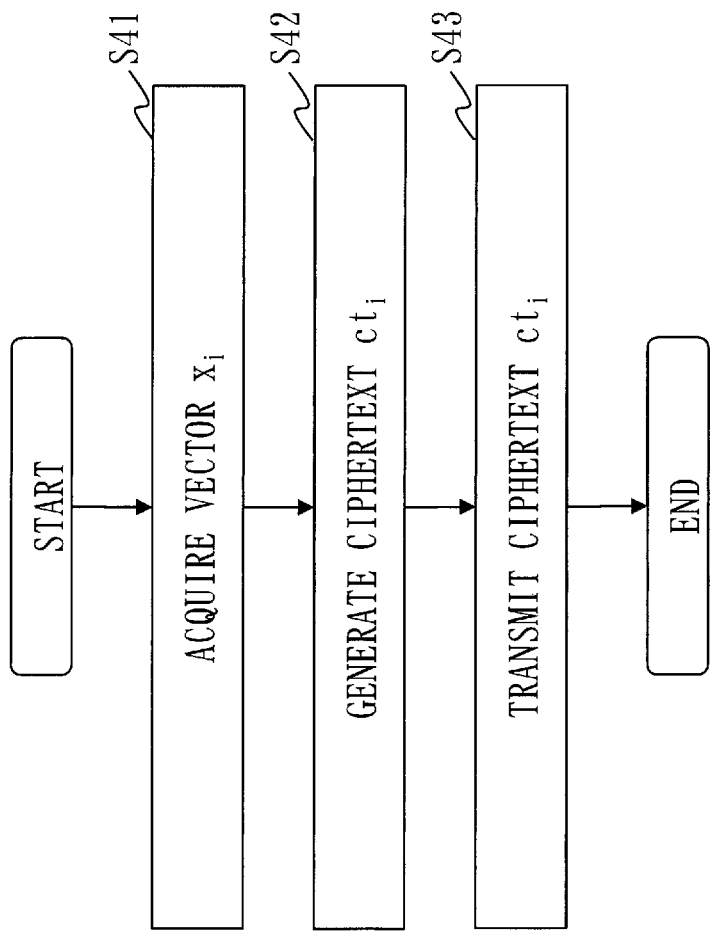
FIG. 11 is a flowchart illustrating behavior of the encryption device 50 according to Embodiment 1.

Behavior of the encryption device 50 according to Embodiment 1 will be described with referring to FIG. 11.

The behavior of the encryption device 50 according to Embodiment 1 corresponds to an encryption method according to Embodiment 1. The behavior of the encryption device 50 according to Embodiment 1 also corresponds to processing of an encryption program according to Embodiment 1.

(Step S41: Vector Acquisition Process)

The vector acquisition unit 513 acquires an m-dimensional vector $x_i$ for each integer i of i=1, ..., n.

Specifically, the vector acquisition unit 513 acquires the vector $x_i$ inputted by an input device or the like which is connected via the communication interface 54. The vector acquisition unit 513 writes the vector $x_i$ to the memory 52.

(Step S42: Encryption Process)

For each integer i of i=1, ..., n, the encryption unit 514 generates a ciphertext $ct_i$ in which the vector $x_i$ is set.

Specifically, the encryption unit 514 reads out the master key mk from the master key storage unit 531. The encryption unit 514 also reads out the encryption token $etk_i$ for each integer i of i=1, ..., n from the token storage unit 532. The encryption unit 514 also reads out the vector $x_i$ for each integer i of i=1, ..., n from the memory 52.

For each integer i of i=1, ..., n, the encryption unit 514 generates a sum of the vector $x_i$ and the encryption token $etk_i$, as a message $m_i$. In short, $m_i := x_i + etk_i = x_i + u_i$. For each integer i of i=1, ..., n, the encryption unit 514 takes as input the message $m_i$ and the master public key $mpk_i$, and executes the Enc algorithm to generate the ciphertext $ct_i$. The encryption unit 514 writes the ciphertext $ct_i$ to the memory 52.

The encryption unit 514 may be provided with a random number generation function if generation of random numbers is necessary for executing the Enc algorithm.

(Step S43: Transmission Process)

The transmission unit 515 transmits the ciphertext $ct_i$ for each integer i of i=1, ..., n to the privacy-preserving analysis device 70.

Specifically, the transmission unit 515 reads out the ciphertext $ct_i$ for each integer i of i=1, ..., n from the memory 52. The transmission unit 515 transmits the ciphertext $ct_i$ for each integer i of i=1, ..., n to the privacy-preserving analysis device 70 via the communication interface 54.

Then, The ciphertext acquisition unit 711 of the privacy-preserving analysis device 70 receives the ciphertext $ct_i$ for each integer i of i=1, ..., n via the communication interface 74. The ciphertext acquisition unit 711 writes the ciphertext $ct_i$ for each integer i of i=1, ..., n to the ciphertext storage unit 731.

In the above case, one encryption device 50 generates the ciphertext $ct_i$ for each integer i of i=1, ..., n. Alternatively, a plurality of encryption devices 50 may each generate a ciphertext $ct_i$ for an integer i of i=1, ..., n. For example, an encryption device 50$i$ for an integer i of i=1, ..., n may generate a ciphertext $ct_i$. In this case, in step S33 of FIG. 10, an encryption token $etk_i$ for an integer i of i=1, ..., n is transmitted to the encryption device 50$i$.

Figure 12:
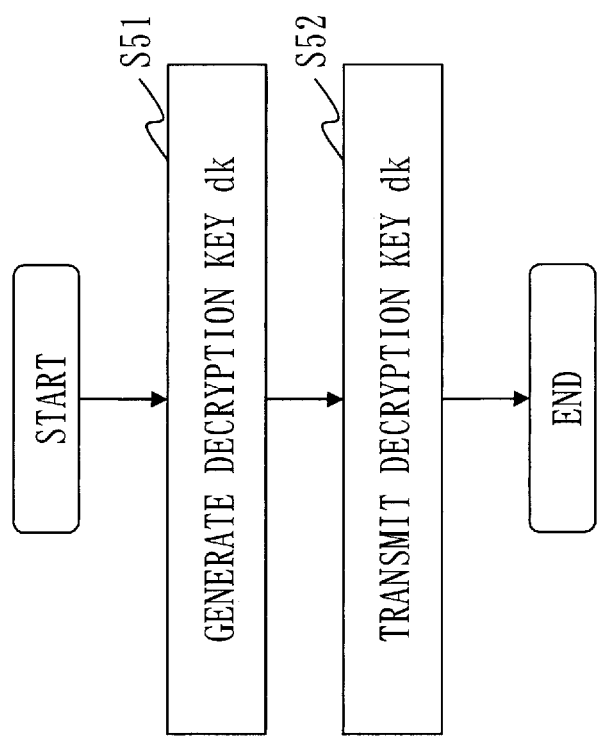
FIG. 12 is a flowchart illustrating behavior of the decryption key generation device 60 according to Embodiment 1.

Behavior of the decryption key generation device 60 according to Embodiment 1 will be described with referring to FIG. 12.

The behavior of the decryption key generation device 60 according to Embodiment 1 corresponds to a decryption key generation method according to Embodiment 1. The behavior of the decryption key generation device 60 according to Embodiment 1 also corresponds to processing of a decryption key generation program according to Embodiment 1.

(Step S51: Decryption Key Generation Process)

The decryption key generation unit 613 generates a decryption key dk.

Specifically, the decryption key generation unit 613 reads out the user secret key $sk_i$ for each integer i of i=1, ..., n from the user secret key storage unit 631. The decryption key generation unit 613 also reads out the decryption token dtk from the token storage unit 632.

The decryption key generation unit 613 calculates a sum of inner product of the vector $y_i$ and vector $u_i$ for each integer i of i=1, ..., n, as a key element z. In short, $z := \Sigma_{i=1}^{n} <y_i, u_i>$. Note that the vector $y_i$ is included in the user secret key $sk_i$. The vector $u_i$ is included in the decryption token dtk.

The decryption key generation unit 613 treats a set of user secret key $sk_i$ for each integer i of i=1, ..., n and the key element z, as the decryption key dk. The decryption key generation unit 613 writes the decryption key dk to the memory 62.

(Step S52: Transmission Process)

The transmission unit 614 transmits the decryption key dk to the privacy-preserving analysis device 70.

Specifically, the transmission unit 614 reads out the decryption key dk from the memory 62. The transmission unit 614 transmits the decryption key dk to the privacy-preserving analysis device 70 via the communication interface 64.

Then, the decryption key acquisition unit 712 of the privacy-preserving analysis device 70 receives the decryption key dk via the communication interface 74. The decryption key acquisition unit 712 writes the decryption key dk to the decryption key storage unit 732.

Figure 13:
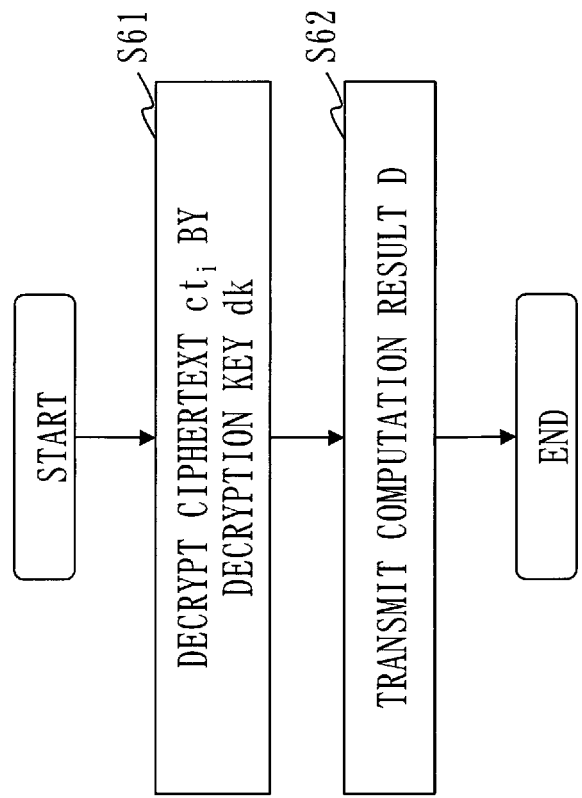
FIG. 13 is a flowchart illustrating behavior of the privacy-preserving analysis device 70 according to Embodiment 1.

Behavior of the privacy-preserving analysis device 70 according to Embodiment 1 will be described referring to FIG. 13.

The behavior of the privacy-preserving analysis device 70 according to Embodiment 1 corresponds to a privacy-preserving analysis method according to Embodiment 1. The behavior of the privacy-preserving analysis device 70 according to Embodiment 1 also corresponds to processing of a privacy-serving analysis program according to Embodiment 1.

(Step S61: Decryption Process)

The decryption unit 713 decrypts the ciphertext $ct_i$ for each integer i of i=1, ..., n by the decryption key dk, so as to generate a computation result D on the vector $x_i$ and vector $y_i$ for each integer i of i=1, ..., n. The ciphertext $ct_i$ is generated by encrypting the information $x_i$ (vector $x_i$) using the encryption token $etk_i$. The decryption key dk is generated from the user secret key $sk_i$ in which the information $y_i$ (vector $y_i$) is set, with using the decryption token dtk corresponding to the encryption token $etk_i$ for each integer i of i=1, ..., n.

Specifically, the decryption unit 713 reads out the ciphertext $ct_i$ for each integer i of i=1, ..., n from the ciphertext storage unit 731. The decryption unit 713 also reads out the decryption key dk from the decryption key storage unit 732.

For each integer i of i=1, n, the decryption unit 713 takes as input the ciphertext $ct_i$ and the user secret key $sk_i$, and executes the Dec algorithm to generate Decryption data $D_i$. The decryption unit 713 subtracts the key element z from a sum of decryption data $D_i$ for each integer i of i=1, ..., n, thereby generating the computation result D. In short, $D := (\Sigma_{i=1}^{n} D_i) - z$. The decryption unit 713 writes the computation result D to the memory 72.

Note that $Di = \langle (x_i + u_i), y_i \rangle$. Hence, $\Sigma_{i=1}^{n} D_i = \Sigma_{i=1}^{n} \langle (x_i + u_i), y_i \rangle$. Also, $z := \Sigma_{i=1}^{n} \langle (y_i, u_i) \rangle$. Hence, $D := (\Sigma_{i=1}^{n} D_i) - z = \Sigma_{i=1}^{n} \langle (x_i + u_i), y_i \rangle - \Sigma_{i=1}^{n} \langle (x_i, u_i) \rangle = \Sigma_{i=1}^{n} \langle x_i, y_i \rangle$. In short, the computation result D is a sum of inner products of the vector $x_i$ and vector $y_i$ for each integer i of i=1, ..., n.

To obtain the computation result D, not the user secret key sk but the decryption key dk is necessary. Therefore, even when the user secret key sk is distributed to the user, the user cannot calculate the computation result D using the user secret key sk.

To obtain the computation result D, it is necessary to give the user secret key sk to the decryption key generation device 60 and to give the decryption token dtk corresponding to the encryption token $etk_i$ used for generation of the computation-target ciphertext $ct_i$, to the decryption key generation device 60. Therefore, even when the user secret key sk is distributed to the user, the user cannot obtain the computation result D at will.

(Step S62: Transmission Process)

The transmission unit 714 transmits the computation result D to an output device such as a display device.

Specifically, the transmission unit 714 reads out the computation result D from the memory 72. The transmission unit 714 transmits the computation result D to the output device such as a display device via the communication interface 74.

*Effect of Embodiment 1*

As described above, the privacy-preserving analysis system 10 according to Embodiment 1 can calculate the inner product of the vector x being set in the ciphertext ct and the vector y being set in the user secret key sk, without decrypting the ciphertext ct. In order to calculate the inner product of the vector x and vector y, the privacy-preserving analysis system 10 according to Embodiment 1 requires not the user secret key sk but the decryption key dk which is generated from the user secret key sk with using the decryption token dtk. Therefore, leakage of information such as the inner product of the vector x and vector y, and the vector x, to the user having the user secret key sk can be prevented.

*Other Configurations*

<Modification 1>

In Embodiment 1, the technique of generating the ciphertext ct using the encryption token etk and generating the decryption key dk from the user secret key sk using the decryption token dtk corresponding to the encryption token is applied to the inner-product encryption. This enables calculation of the computation result D, which is an inner product of the vector x being set in the ciphertext ct and the vector y being set in the user secret key sk, while preventing leakage of information.

When the above technique is applied not to the inner-product encryption but to cryptography that performs another computation over data remaining encrypted, it is possible to calculate a result of computation that employs computation other than inner product, while preventing information leakage. In this case, there is a possibility that not the vector x or the vector y, but information x and information y in some format are set in a ciphertext and a user secret key.

<Modification 2>

In Embodiment 1, the individual function-constituent elements are implemented by software. In Modification 2, the individual function-constituent elements may be implemented by hardware. Modification 2 will be described regarding its difference from Embodiment 1.

Figure 14:
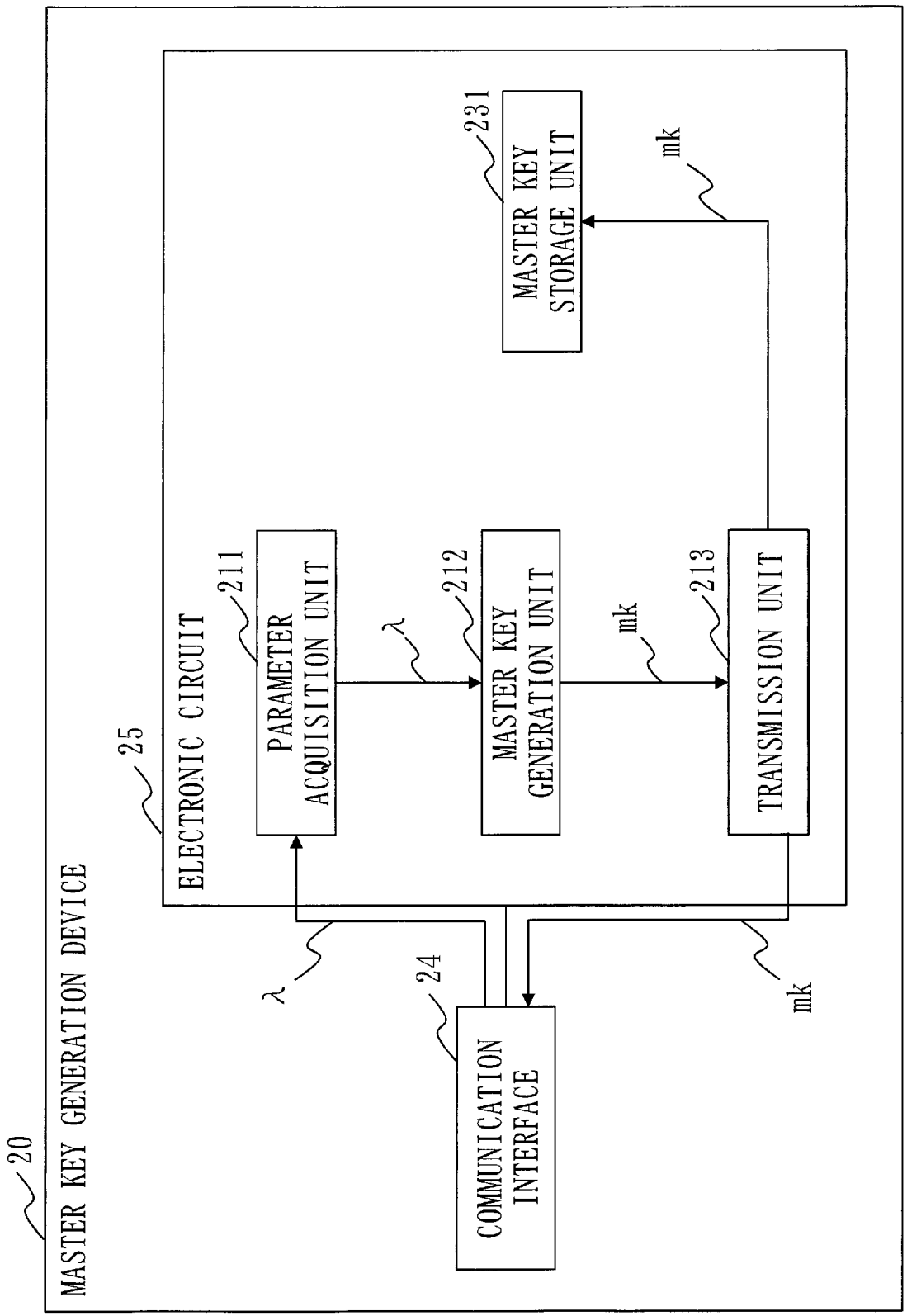
FIG. 14 is a configuration diagram of a master key generation device 20 according to Modification 2.

A configuration of a master key generation device 20 according to Modification 2 will be described with referring to FIG. 14.

To implement functions of the master key generation device 20 by hardware, the master key generation device 20 is provided with an electronic circuit 25 in place of a processor 21, a memory 22, and a storage 23. The electronic circuit 25 is a dedicated circuit that implements functions of function-constituent elements of the master key generation device 20 and functions of the memory 22 and storage 23.

Figure 15:
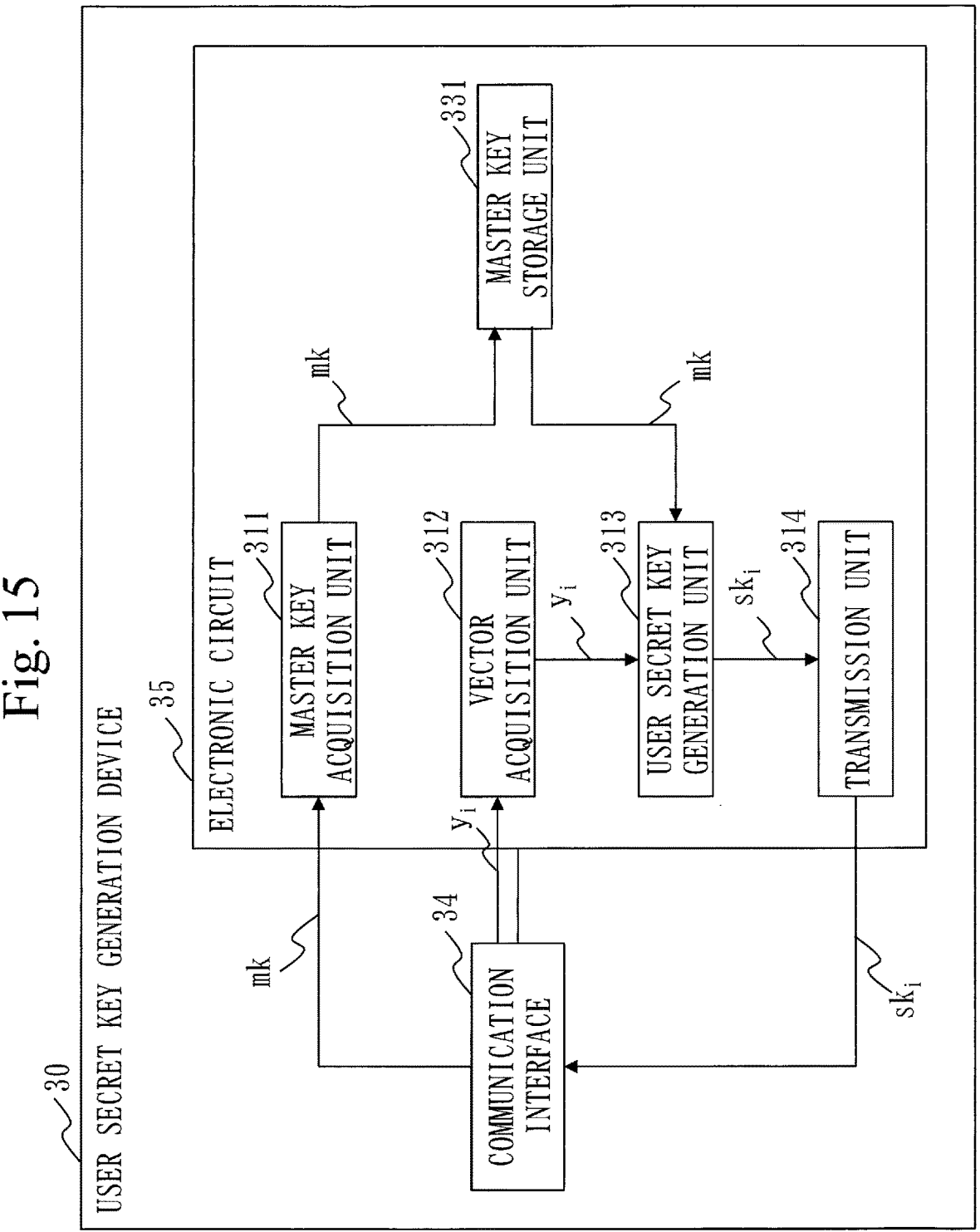
FIG. 15 is a configuration diagram of a user secret key generation device 30 according to Modification 2.

A configuration of a user secret key generation device 30 according to Modification 2 will be described with referring to FIG. 15.

To implement functions of the user secret key generation device 30 by hardware, the user secret key generation device 30 is provided with an electronic circuit 35 in place of a processor 31, a memory 32, and a storage 33. The electronic circuit 35 is a dedicated circuit that implements functions of function-constituent elements of the user secret key generation device 30 and functions of the memory 32 and storage 33.

Figure 16:
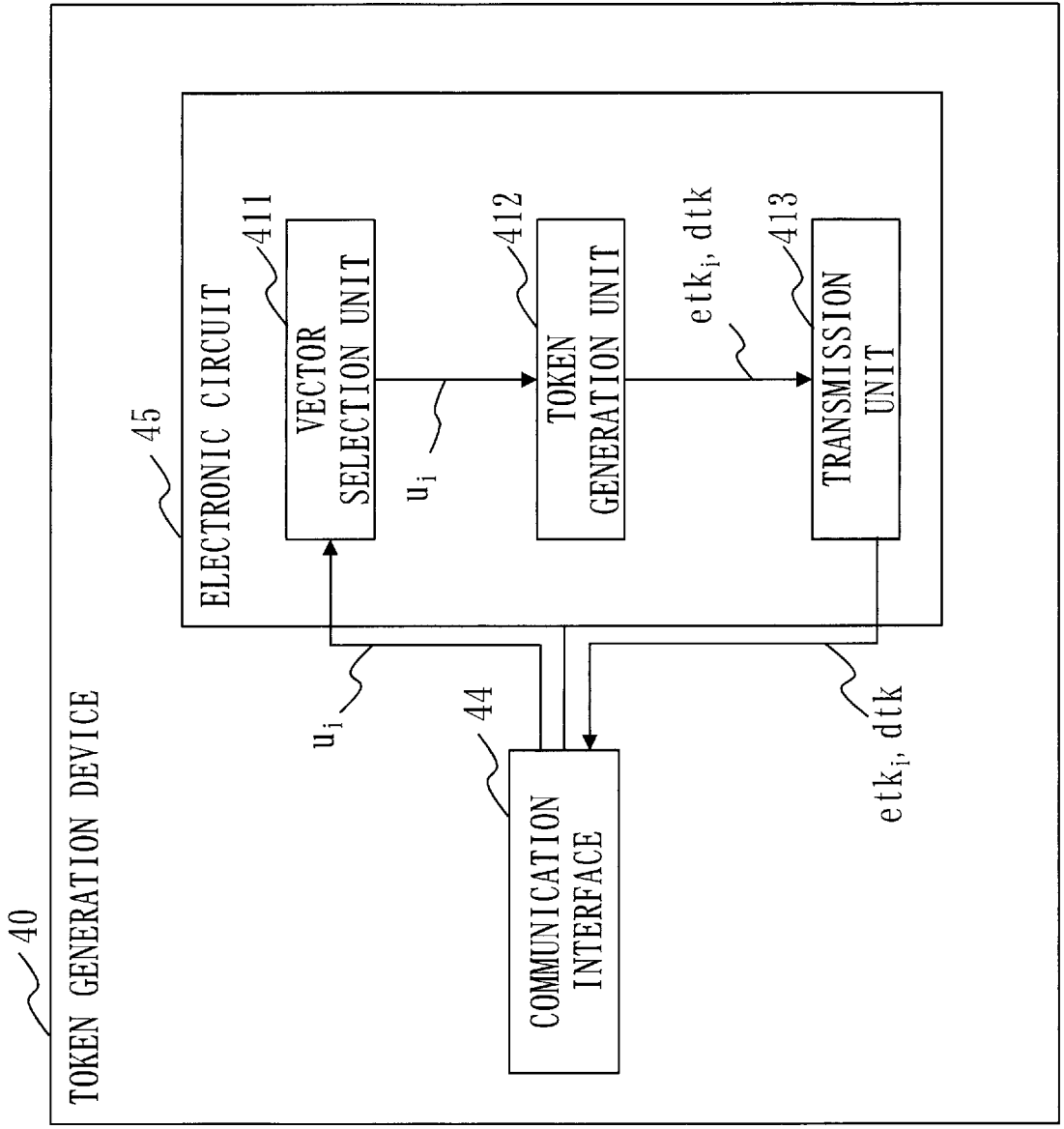
FIG. 16 is a configuration diagram of a token generation device 40 according to Modification 2.

A configuration of a token generation device 40 according to Modification 2 will be described with referring to FIG. 16.

To implement functions of the token generation device 40 by hardware, the token generation device 40 is provided with an electronic circuit 45 in place of a processor 41, a memory 42, and a storage 43. The electronic circuit 45 is a dedicated circuit that implements functions of function-constituent elements of the token generation device 40 and functions of the memory 42 and storage 43.

Figure 17:
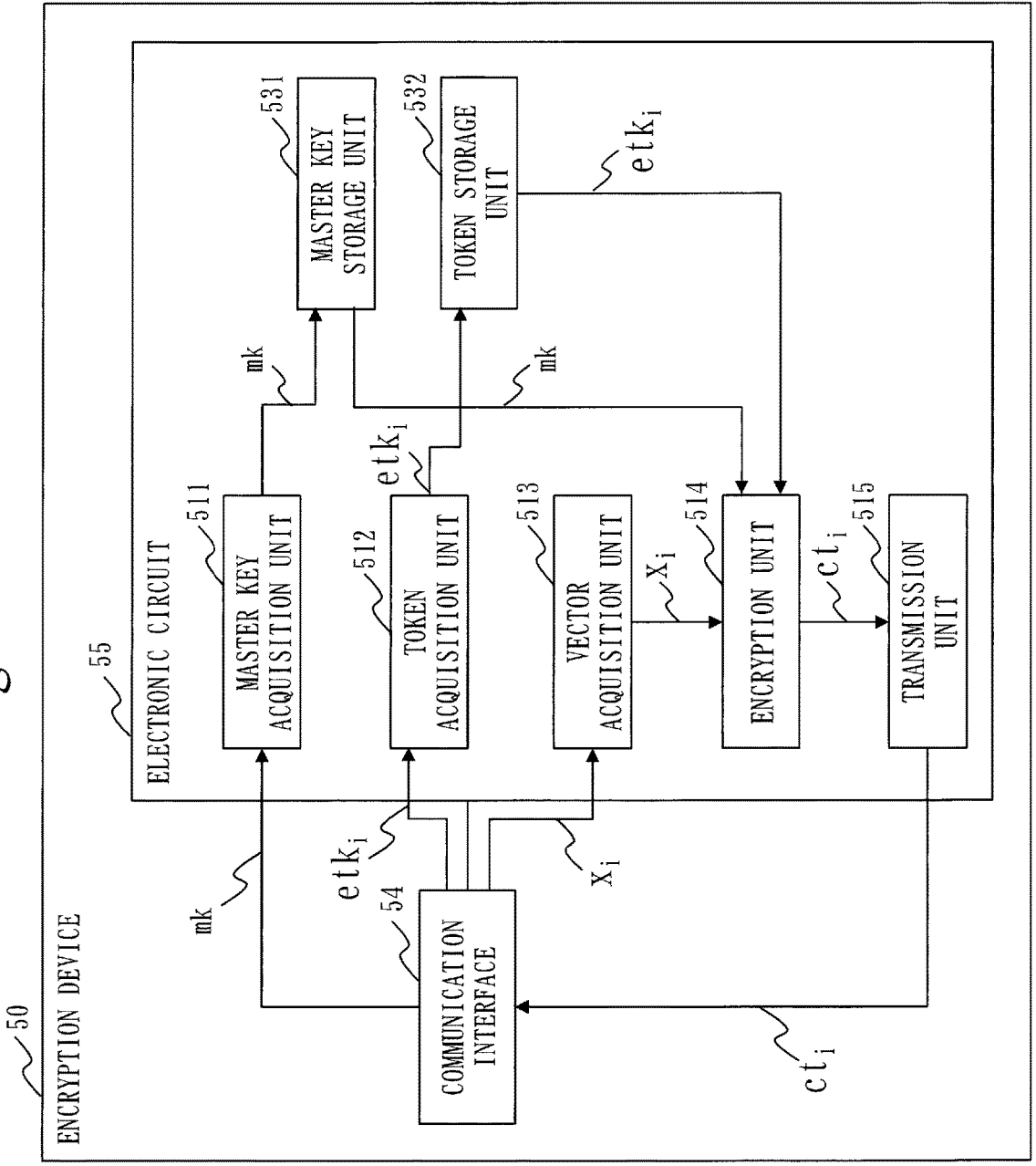
FIG. 17 is a configuration diagram of an encryption device 50 according to Modification 2.

A configuration of an encryption device 50 according to Modification 2 will be described with referring to FIG. 17.

To implement functions of the encryption device 50 by hardware, the encryption device 50 is provided with an electronic circuit 55 in place of a processor 51, a memory 52, and a storage 53. The electronic circuit 55 is a dedicated circuit that implements functions of function-constituent elements of the encryption device 50 and functions of the memory 52 and storage 53.

Figure 18:
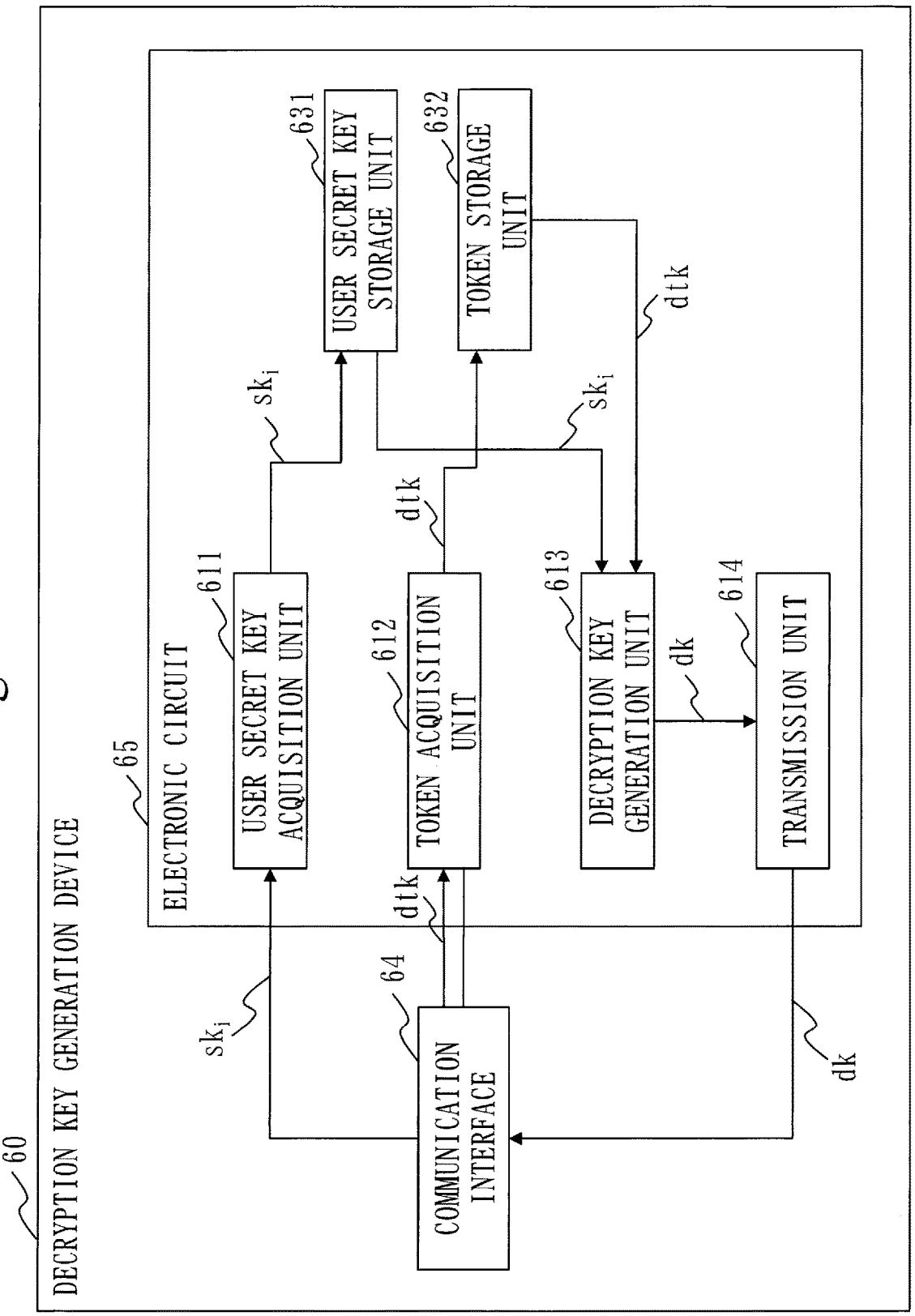
FIG. 18 is a configuration diagram of a decryption key generation device 60 according to Modification 2.

A configuration of a decryption key generation device 60 according to Modification 2 will be described with referring to FIG. 18.

To implement functions of the decryption key generation device 60 by hardware, the decryption key generation device 60 is provided with an electronic circuit 65 in place of a processor 61, a memory 62, and a storage 63. The electronic circuit 65 is a dedicated circuit that implements functions of function-constituent elements of the decryption key generation device 60 and functions of the memory 62 and storage 63.

Figure 19:
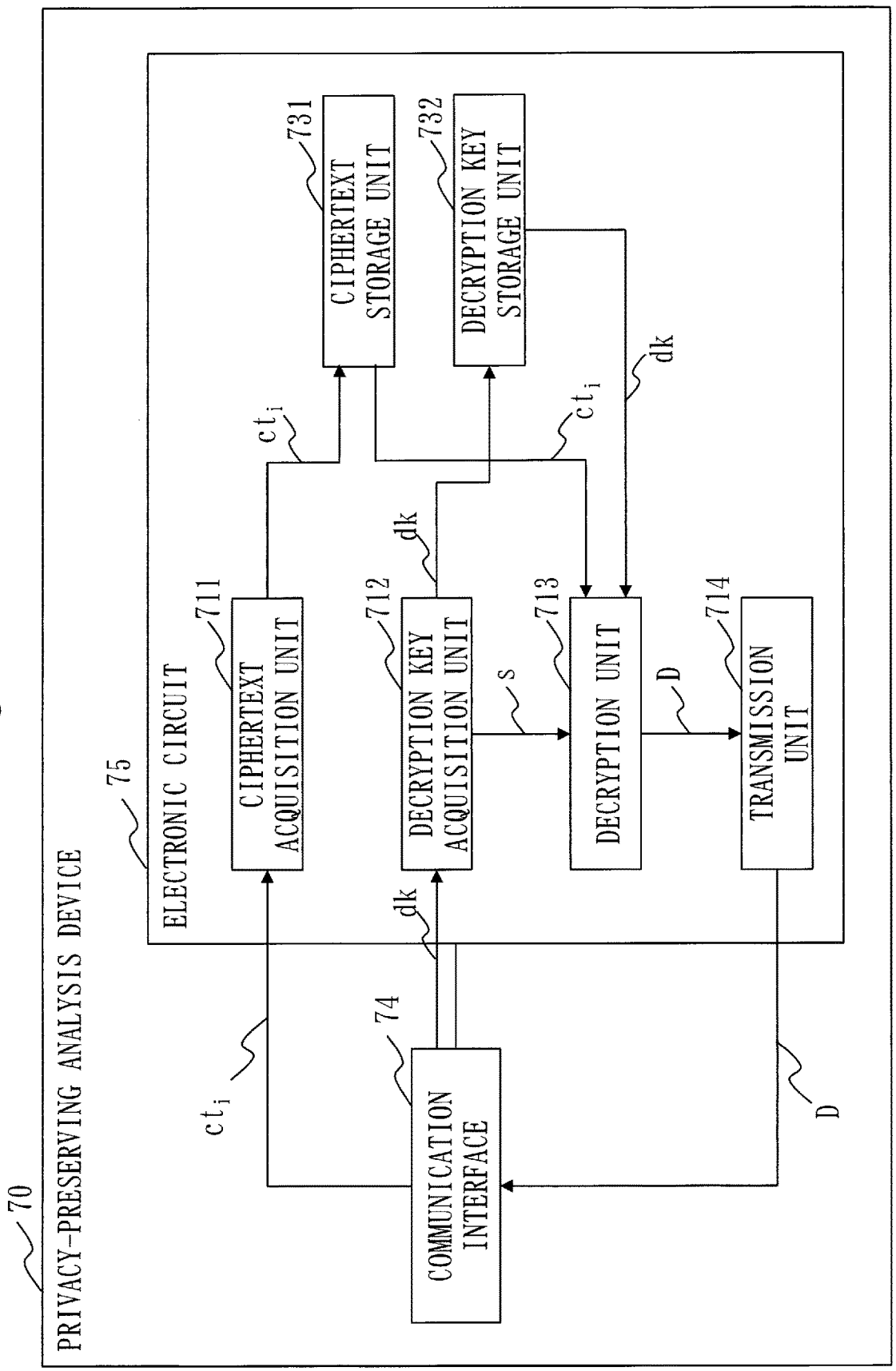
FIG. 19 is a configuration diagram of a privacy-preserving analysis device 70 according to Modification 2.

A configuration of a privacy-preserving analysis device 70 according to Modification 2 will be described with referring to FIG. 19.

To implement functions of the privacy-preserving analysis device 70 by hardware, the privacy-preserving analysis device 70 is provided with an electronic circuit 75 in place of a processor 71, a memory 72, and a storage 73. The electronic circuit 75 is a dedicated circuit that implements functions of function-constituent elements of the privacy-preserving analysis device 70 and functions of the memory 72 and storage 73.

Each of the electronic circuits 25, 35, 45, 55, 65, and 75 is assumed to be a single circuit, a composite circuit, a programmed processor, a parallel-programmed processor, a logic IC, a gate array (GA), an application specific integrated circuit (ASIC), or a field-programmable gate array (FPGA).

The functions of the individual function-constituent elements of the master key generation device 20 may be implemented by one electronic circuit 25, or may be implemented by a plurality of electronic circuits 25 through distribution. Likewise, in the user secret key generation device 30, the token generation device 40, the encryption device 50, the decryption key generation device 60, and privacy-preserving analysis device 70, the functions of individual function-constituent elements may be implemented by one electronic circuit 35, one electronic circuit 45, one electronic circuit 55, one electronic circuit 65, and one electronic circuit 75, respectively, or may be implemented by a plurality of electronic circuits 35, a plurality of electronic circuits 45, a plurality of electronic circuits 55, a plurality of electronic circuits 65, and a plurality of electronic circuits 75, respectively, through distribution.

<Modification 3>

In Modification 3, some of the functions may be implemented by hardware, and the remaining functions may be implemented by software. That is, the functions of some of the individual function-constituent elements may be implemented by hardware, and the functions of the remaining individual function-constituent elements may be implemented by software.

The processors 21, 31, 41, 51, 61, and 71, the memories 22, 32, 42, 52, 62, and 72, the storages 23, 33, 43, 53, 63, and 73, and the electronic circuits 25, 35, 45, 55, 65, and 75 are processing circuitry each. That is, the functions of the individual function-constituent elements are implemented by processing circuitry.

REFERENCE SIGNS LIST

10: privacy-preserving analysis system; 20: master key generation device; 21: processor; 22: memory; 23: storage; 24: communication interface; 25: electronic circuit; 211: parameter acquisition unit; 212: master key generation unit; 213: transmission unit; 231: master key storage unit; 30: user secret key generation device; 31: processor; 32: memory; 33: storage; 34: communication interface; 35: electronic circuit; 311: master key acquisition unit; 312: vector acquisition unit; 313: user secret key generation unit; 314: transmission unit; 331: master key storage unit; 40: token generation device; 41: processor; 42: memory; 43: storage; 44: communication interface; 45: electronic circuit; 411: vector selection unit; 412: token generation unit; 413: transmission unit; 50: encryption device; 51: processor; 52: memory; 53: storage; 54: communication interface; 55: electronic circuit; 511: master key acquisition unit; 512: token acquisition unit; 513: vector acquisition unit; 514: encryption unit; 515: transmission unit; 531: master key storage unit; 532: token storage unit; 60: decryption key generation device; 61: processor; 62: memory; 63: storage; 64: communication interface; 65: electronic circuit; 611: user secret key acquisition unit; 612: token acquisition unit; 613: decryption key generation unit; 614: transmission unit; 631: user secret key storage unit; 632: token storage unit; 70: privacy-preserving analysis device; 71: processor; 72: memory; 73: storage; 74: communication interface; 75: electronic circuit; 711: ciphertext acquisition unit; 712: decryption key acquisition unit; 713: decryption unit; 714: transmission unit; 731: ciphertext storage unit; 732: decryption key storage unit.

The invention claimed is:

1. A privacy-preserving analysis device comprising:
processing circuitry
to acquire, for each integer i of i=1 . . . , n concerning an integer n of 1 or more, a ciphertext $ct_i$ encrypted from a sum $m_i$ of an encryption token $etk_i$, being a vector $u_i$, and information $x_i$;
to acquire a decryption key dk generated with using a decryption token dtk and a user secret key $sk_i$, the decryption token dtk including the vector $u_i$ for each integer i, the user secret key $sk_i$ being set with information $y_i$ for each integer i, the decryption key dk including a sum z of inner product of the vector $u_i$ and the information $y_i$ for each integer i;
to decrypt the ciphertext $ct_i$ for each integer i, using a decryption algorithm in a cryptography that calculates inner product of information being set in the ciphertext and information being set in the user secret key; and
to generate decryption data $D_i$, and to subtract the sum z included in the decryption key dk from a sum of the decryption data $D_i$ for each integer i, thereby calculating a sum of inner product of the information $x_i$ and the information $y_i$ for each integer i, wherein
the decryption token dtk corresponds to the encryption token $etk_i$ for each integer i of i=1 . . . , n.

2. A privacy-preserving analysis system comprising:
a first processing circuitry to generate, for each integer i of i=1 n concerning an integer n of 1 or more, a ciphertext $ct_i$ encrypted from a sum $m_i$ of an encryption token $etk_i$, being a vector $u_i$, and information $x_i$;
a second processing circuitry to generate a decryption key dk, with using a decryption token dtk and a user secret key $sk_i$, the decryption token dtk including the vector $u_i$ for each integer i, the user secret key $sk_i$ being set with information $y_i$ for each integer i, the decryption key dk including a sum z of inner product of the vector $u_i$ and the information $y_i$ for each integer i; and
a third processing circuitry to decrypt the ciphertext $ct_i$ for each integer i, the ciphertext $ct_i$ being generated by the encryption device, using a decryption algorithm in a cryptography that calculates inner product of information being set in the ciphertext and information being set in the user secret key, wherein
the third processing circuitry generates decryption data $D_i$ and subtracts the sum z included in the decryption key dk generated by the decryption key generation device, from a sum of the decryption data $D_i$ for each integer i, thereby calculating a sum of inner product of the information $x_i$ and the information y for each integer i, and the decryption token dtk corresponds to the encryption token $etk_i$ for each integer i of i=1 ..., n.

3. A privacy-preserving analysis method comprising:

acquiring, for each integer i of i=1 ..., n concerning an integer n of 1 or more, a ciphertext ct encrypted from a sum $m_i$ of an encryption token $etk_i$, being a vector $u_i$, and information $x_i$;

acquiring a decryption key dk generated with using a decryption token dtk and a user secret key $sk_i$, the decryption token dtk including the vector for each integer i, the user secret key $sk_i$ being set with information $y_i$ for each integer i, the decryption key dk including a sum z of inner product of the vector $u_i$ and the information $y_i$ for each integer i;

decrypting the ciphertext $ct_i$ for each integer i, using a decryption algorithm in a cryptography that calculates inner product of information being set in the ciphertext and information being set in the user secret key; and generating decryption data $D_i$ and subtracting the sum z included in the decryption key dk from a sum of the decryption data $D_i$ for each integer, thereby calculating a sum of inner product of the information $x_i$ and the information $y_i$ for each integer, wherein the decryption token dtk corresponds to the encryption token $etk_i$ for each integer i of i=1 ..., n.

4. A non-transitory computer readable medium storing a privacy-preserving analysis program which causes a computer to execute:

a ciphertext acquisition process of acquiring, for each integer i of i=1 ..., n concerning an integer n of 1 or more, a ciphertext $ct_i$ encrypted from a sum $m_i$ of an encryption token $etk_i$, being a vector $u_i$, and information $x_i$;

a decryption key acquisition process of acquiring a decryption key dk generated with using a decryption token dtk and a user secret key $sk_i$, the decryption token dtk including the vector $u_i$ for each integer i, the user secret key $sk_i$ being set with information $y_i$ for each integer i, the decryption key dk including a sum z of inner product of the vector $u_i$ and the information $y_i$ for each integer i; and a decryption process of decrypting the ciphertext $ct_i$ for each integer i, using a decryption algorithm in a cryptography that calculates inner product of information being set in the ciphertext and information being set in the user secret key, wherein the decryption process generates decryption data $D_i$ and subtracts the sum z included in the decryption key dk from a sum of the decryption data $D_i$ for each integer, thereby calculating a sum of inner product of the information $x_i$ and the information $y_i$ for each integer, and the decryption token dtk corresponds to the encryption token $etk_i$ for each integer i of i=1 ..., n.

* * * * *